(12) United States Patent
Mou et al.

(10) Patent No.: US 9,557,810 B2
(45) Date of Patent: Jan. 31, 2017

(54) SOMATOSENSORY RECOGNITION SYSTEM AND RECOGNITION METHOD THEREOF

(71) Applicant: BOE TECHNOLOGY GROUP CO., LTD., Beijing (CN)

(72) Inventors: Xinxin Mou, Beijing (CN); Xingxing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/600,321

(22) Filed: Jan. 20, 2015

(65) Prior Publication Data
US 2016/0195920 A1   Jul. 7, 2016

(30) Foreign Application Priority Data
Jan. 5, 2015  (CN) .......................... 2015 1 0002727

(51) Int. Cl.
| | | |
|---|---|---|
| *G06F 3/041* | (2006.01) | |
| *G06F 3/01* | (2006.01) | |
| *G09G 5/00* | (2006.01) | |
| *G06F 3/03* | (2006.01) | |

(52) U.S. Cl.
CPC ............... *G06F 3/011* (2013.01); *G06F 3/014* (2013.01); *G06F 3/0304* (2013.01); *G09G 5/003* (2013.01); *G06F 3/017* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 2009/0033623 A1* | 2/2009 | Lin ........................ | G06F 3/014 345/158 |
| 2014/0176436 A1* | 6/2014 | Raffa ...................... | G06F 3/017 345/158 |

* cited by examiner

*Primary Examiner* — Joseph Haley
(74) *Attorney, Agent, or Firm* — Ladas & Parry LLP

(57) ABSTRACT

Disclosed is a somatosensory recognition system for recognizing a human body's action and a recognition method thereof. The somatosensory recognition system comprises: an acquisition device configured to acquire a first motion track data of a body parts' action; a wearable device worn on the body parts and configured to acquire a second motion track data of the body parts' action; and a processing device configured to compare the first motion track data and the second motion track data and determine the body parts' action according to comparison result. The above somatosensory recognition system and the recognition method thereof can improve the accuracy of somatosensory recognition.

16 Claims, 2 Drawing Sheets

SOMATOSENSORY RECOGNITION SYSTEM AND RECOGNITION METHOD THEREOF

TECHNICAL FIELD

Embodiments of the present invention relate to the somatosensory recognition field, in particularly to a somatosensory recognition system and a recognition method thereof for recognizing body's action.

BACKGROUND

At present, with the progressive development of somatosensory recognition technology, somatosensory recognition has been applied in people's daily life more and more. Somatosensory recognition is mainly used to recognize and obtain a body's positions in movement, such as head, arms, or feet, and then implement man-machine control by means of auxiliary equipments depending on the data of the obtained positions. The somatosensory recognition may be applied in environment, such as in playing games, in control of TV set, and in the office. In case of TV somatosensory games as an example, people can play games easily while watching TV, and realize better man-machine interaction effect with the TV as a bearer.

However, in main stream somatosensory recognition systems, most of them capture body's action with image pick-up elements, and participators need to stand in just front of the image pick-up elements for capture an image accurately. However, there is certain error with the above-mentioned method. For example, while the body moves in three directions, i.e., Z (such as up-down direction relative to the image pick-up element), Y (such as left-right direction) and X (such as front-rear direction) directions, since the image pick-up element is not sensitive to the movement in Z direction, misjudgments tend to occur in the Z direction parallel to the image pick-up element. In particular in case of an arm as the recognized object, if the arm is blocked by the body, the conventional somatosensory recognition system can not acquire the arm's position, thereby failing to determine body's action accurately.

SUMMARY

According to the first aspect of the present invention, there is provided a somatosensory recognition system for recognizing a human body's action, comprising: an acquisition device configured to acquire a first motion track data of a body parts' action; a wearable device worn on the body parts and configured to acquire a second motion track data of the body parts' action; and a processing device configured to compare the first motion track data and the second motion track data and determine the body parts' action according to comparison result.

According to the second aspect of the present invention, there is provided a somatosensory recognition method using the above-mentioned somatosensory recognition system, comprising: acquiring a first motion track data of body parts' action; acquiring a second motion track data of the body parts' action, the second motion track data being recorded by a wearable device worn on the body parts; and comparing the first motion track data and the second motion track data and determining the body parts' action according to comparison result.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
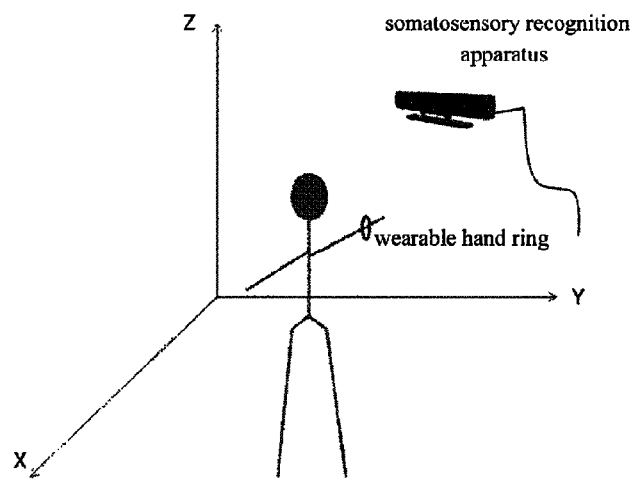
FIG. 1 illustrates a simplified schematic diagram of a somatosensory recognition system according to an embodiment of the present invention.

In general, embodiments of the present invention provide a somatosensory recognition system for recognizing the human body's action, and a recognition method by using the somatosensory recognition system. As illustrated in FIG. 1, the somatosensory recognition system can be embodied as a somatosensory recognition apparatus, which comprises: an article worn on the human body (such as a hand ring), in which an acquisition unit and a processing unit (optionally, an output device) are both integrated. The term "human body's action" or "human body parts' action" as used herein refers to the movement of body parts to be recognized by the somatosensory recognition system. The body parts include but not limited to hands, upper limbs, lower limbs, head, and feet. The term "wearable articles" as used herein refers to the article worn on a human body, including but not limited to clothes, pants, shoes, socks, glove, etc., and the article adorned a human body, including but not limited to a hand ring, a watch, a finger ring, jewelries, glasses, a kerchief, and a hat, the "wearable articles" further include ornamental articles or hanging articles mounted on the above articles such as fasteners and glasses.

Embodiment 1

Figure 2:
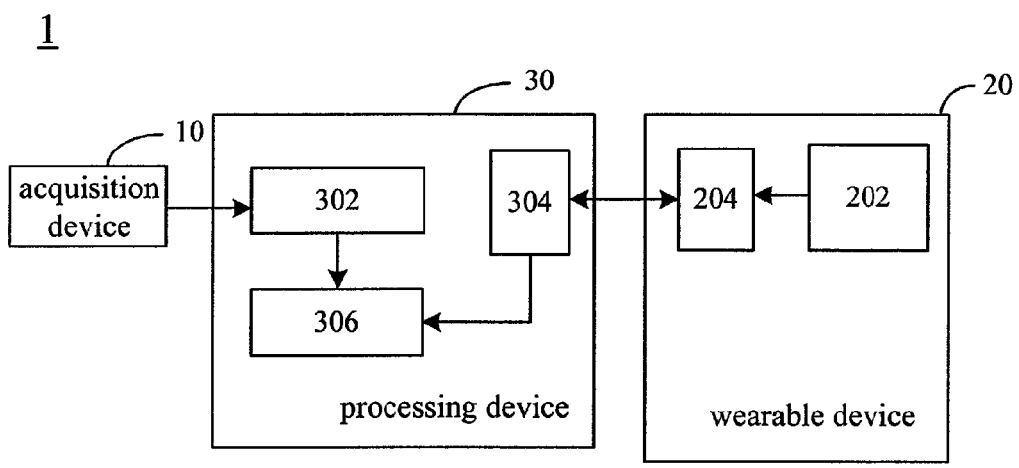
FIG. 2 illustrates a block diagram of a somatosensory recognition system according to an embodiment of the present invention.

The present embodiment provides a somatosensory recognition system 1 as illustrated in FIG. 2, comprising an acquisition device 10, a wearable device 20 wearable on body parts and a processing device 30. The acquisition device 10 is configured to acquire a first motion track data of body parts' action. The wearable device 20 is configured to acquire a second motion track data of the body parts' action. The processing device 30 which communicates with both the acquisition device 10 and the wearable device 20 is configured to compare the first motion track data and the second motion track data, and determine the body parts' action according to the comparison result. The respective devices will be described in more detail below.

In one embodiment, the acquisition device 10 comprises at least one image pick-up element for capturing still images or motion video of a human body. For example, the acquisition device 10 comprises more than two image pick-up elements.

In one embodiment, the processing device 30 comprises an action recognition unit 302, which is connected with the acquisition device 10 and configured for extracting a first position information of the body parts from the first motion track data. The action recognition unit 302 adopts for example binocular stereovision technology, light time of flight (TOF) technology or structured light technology to recognize or extract the body's position information. The action recognition unit 302 connected with the acquisition device 10 is to recognize and analyze the received images or video so as to obtain a first position information that reflects the position of the body parts. The first position information is for example a triaxial spatial coordinate data (x1, y1, z1). Then, the action recognition unit 302 sends the first position information to an action judgment unit 306. In one example, the acquisition device 10 and the action recognition unit 302 may be integrated together.

In one embodiment, the processing device 30 further comprises a first wireless transmission unit 304 and an action judgment unit 306. The first wireless transmission unit 304 is configured to receive the second motion track data from the wearable device 20 and send it to the action judgment unit 306. The action judgment unit 306 has one end connected with the action recognition unit 302 and configured for receiving the first position information, and has the other end connected with the first wireless transmission unit 304 and configured for receiving the second motion track data from the first wireless transmission unit 304 and extracting a second position information of the wearable device 20 from the second motion track data. Then, the action judgment unit 306 compares the first position information and the second position information to determine the position of body parts according to the comparison result. The second position information is also for example a triaxial spatial coordinate data.

In one embodiment, the wearable device 20 comprises a carrier, in which a data acquisition unit 202 and a second wireless transmission unit 204 disposed in the carrier. The data acquisition unit 202 is configured to acquire the second motion track data. The data acquisition unit 202 comprises for example a sensor. The sensor may be for example an accelerometer, a magnetic flow meter or a gyro. The second wireless transmission unit 204 is connected with the data acquisition unit 202, and is configured for receiving the second motion track data and sending it to the first wireless transmission unit 304. The first wireless transmission unit 304 and the second wireless transmission unit 204 are for example Bluetooth, infrared or radio frequency units for realizing wireless communication without obstructing human body's movement. Of course, in other embodiments, the wearable device may further comprise other units, such as a display unit (not illustrated) facilitating the wearer to view data or information and/or an input unit (not illustrated) such as buttons. The first and second wireless transmission units have functions of both sending and receiving the data (or the information).

The wearable device 20 uses for example a wearable article as its carrier. The carrier may be an article worn or adorned the human body, such as a watch, a finger ring, a pair of glasses, a helmet, clothing, pants, shoes etc., thereby moving along with the human motion. For example, the carrier is typically in a solid state, such that the data acquisition unit 202 and the second wireless transmission unit 204 can be mounted or embedded therein. For more comfort wearing, the carrier is preferably flexible, that is, made of flexible material, such that the carrier may wrap extremities of a human body, such as plastic hand ring, feet ring and armlet. Gloves, hats and sport kerchiefs of fabric texture may also be used as carriers.

As compared to conventional somatosensory recognition technologies, embodiments of the present invention utilize a wearable device that may be worn on a human body to provide the second motion track data which also reflects the motion track data of body parts. By means of comparing the second motion track data against the first motion track data, more accurate position information can be obtained, thereby improving the accuracy of somatosensory recognition.

Furthermore, in one embodiment, to facilitate data comparison, before comparing the first position information and the second position information, the action judgment unit 306 further perform a normalization processing on the second position information, the normalization comprises steps of: storing an initial first position information recognized by the action recognition unit 302 while the body parts are initially being in stationary state (i.e., at rest), and then when the part is moving, adding the second position information to the stored initial first position information so as to obtain a normalized second position information. In this way, when the body parts move, the normalized second position information may be compared against the first position information that is obtained in real time in the same coordinate system. If the difference between the first position information and the normalized second position information is within a threshold range, the average of the first position information and the normalized second position information is taken as the position of body parts; if the difference between the first position information and the normalized second position information exceeds the threshold range, the normalized second position information is taken as the position of the body parts.

Figure 3:
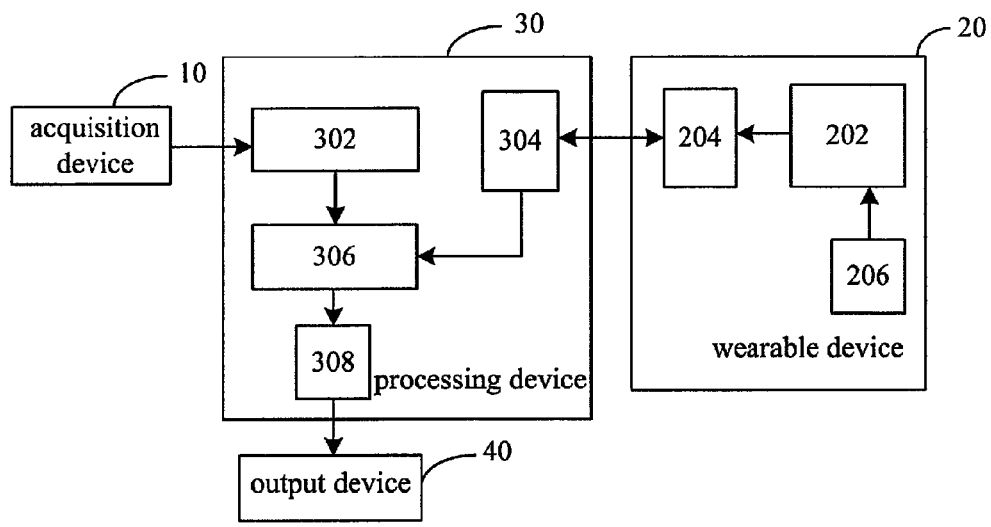
FIG. 3 illustrates a block diagram of a somatosensory recognition system according to another embodiment of the present invention.

FIG. 3 illustrates a variation of the above-mentioned somatosensory recognition system 1. The somatosensory recognition system 1' differs from the somatosensory recognition system 1 in that it further comprises an output device 40, for example a display, which is connected with the processing device 30 and configured for outputting instructions corresponding to the body parts' action. The processing device 30 further comprises a first control unit 308 connected with the action judgment unit 306 and configured for looking up respective action instructions according to a change in the determined position of body parts and sending the action instruction to the output device. The wearable device 20 further comprises a second control unit 206 for resetting (i.e., return to zero) the data acquisition unit 202. When the body parts are initially at rest, the data acquisition unit 202 is returned to zero. In this way, when the body parts moves, it is possible to add the second position information acquired by the data acquisition unit 202 to the first position information obtained by the image pick-up element, which is favorable to implement the aforementioned normalization operation. For example, in case that the wearable device is a hand ring, setting a certain position in a coordinate system of the image pick-up element (namely the acquisition device 10) as the zero position. While the hand ring reaches the zero position, the output device (e.g., display) may change its color or flicker so as to prompt the user to reset the data acquisition unit 202 via the second control unit 206. The zero position may be set as any arbitrary point in the area recognizable by the image pick-up element.

Figure 4:
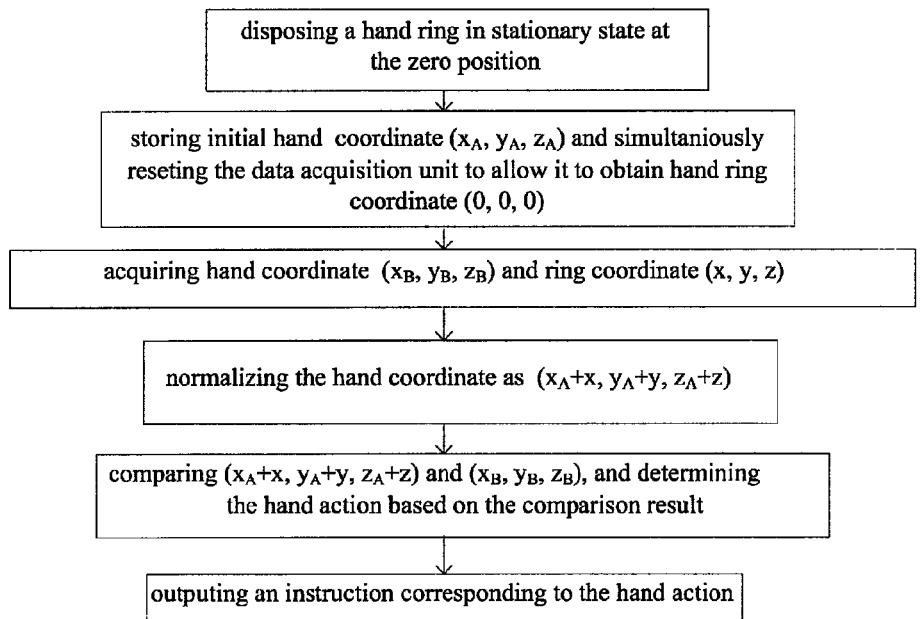
FIG. 4 illustrates a flow chart of a somatosensory recognition system according to an embodiment of the present invention in operation.

The operation principle of the somatosensory recognition system 1' will be described below with respect to a hand ring worn on hand as an example of the wearable device 20 with reference to FIG. 4. When the somatosensory recognition system 1 is turned on, the hand ring is in stationary state at point A ($x_A$, $y_A$, $z_A$) (which is the hand coordinates recognized by the action recognition unit 302) in the recognized area of the acquisition device 10 (e.g., image pick-up element). Assuming the point A is the zero position, then the processing device 30 stores coordinate values $x_A$, $y_A$ and $z_A$. At the same time, the second control unit 206 resets the data acquisition unit 202 to allow it to obtain the hand ring coordinate (0, 0, and 0). A series of spatial coordinates may be generated as the hand moves. For example, while the hand ring moves towards the image pick-up element, the x coordinate is negative, while away from the image pick-up element, the x coordinate is positive. With respect to the image pick-up element, y coordinate is positive while the hand ring moves right, and is negative while it moves left; and the z coordinate is positive while the hand ring moves upward, and is negative while it moves downward. Assuming that when the ring moves to point B, the hand coordinate acquired by the image pick-up element is ($x_B$, $y_B$, $z_B$), and the ring coordinate obtained by the data acquisition unit 202 is (x, y, z), then the processing device 30 adds x, y, z to $x_A$, $y_A$, $z_A$ respectively to obtain the normalized ring coordinate: ($x_A$+x, $y_A$+y, $z_A$+z). Next, the ring coordinate ($x_A$+x, $y_A$+y, $z_A$+z) is compared to the hand coordinate ($x_B$, $y_B$, $z_B$). If coordinates in various directions are all within a certain threshold range, the average (($x_A$+x+$x_B$)/2, ($y_A$+y+$y_B$)/2, ($z_A$+z+$z_B$)/2) is taken as the final position of the hand; if they exceed the threshold range, then the ring coordinate ($x_A$+x, $y_A$+y, $z_A$+z) is taken as the final position of the hand. Since the hand motion constitutes of a series of position changes of hand, the processing device 30 may determine the hand's action according to the change in hand's positions, and thereby looking up the action instruction corresponding to the action and sending it to the output device 40.

In order to determine more accurately, in one example, if the difference between the ring coordinate ($x_A$+x, $y_A$+y, $z_A$+z) and the hand coordinate ($x_B$, $y_B$, $z_B$) exceeds the threshold range, both the ring and hand data are acquired again for determination; if the difference between them exceeds the threshold range successively for n (which may be set to e.g., 10) times, the coordinate calculated from the ring will be adopted.

In the above mentioned somatosensory recognition system, when the body action changes or a part of the body moves, the first motion track data of the body parts is obtained by the acquisition device, the second motion track data of the body parts is acquired by the wearable device, and then the first and second motion track data are compared to determine the body's action. As compared to the conventional somatosensory recognition technology, the present embodiment provides more accurate position information by the wearable device that senses in real time as the body parts moves, thereby improving the accuracy of somatosensory recognition.

Embodiment 2

The present embodiment provides a somatosensory recognition method using the above-mentioned somatosensory recognition system 1, comprising steps of:

acquiring a first motion track data of body parts' action;

acquiring a second motion track data of the body parts' action, the second motion track data being recorded by a wearable device worn on the body parts;

comparing the first motion track data and the second motion track data and determining the body parts' action according to comparison result.

In one embodiment of the above-mentioned method, the step of comparing the first motion track data and the second motion track data comprises:

acquiring a first position information of the body parts' action from the first motion track data, and acquiring a second position information of the wearable device from the second motion track data, and comparing the first position information and the second position information.

In one example, to facilitate comparison of data, before comparing the first position information and the second position information, the method further comprises:

normalizing the second position information, wherein the normalization comprises: storing an initial first position information while the body parts are in stationary state, and then adding the second position information to the stored initial first position information while the body parts is moving to get the normalized second position information.

In this case, during the comparison of the first position information and the normalized second position information, if the difference between the first position information and the normalized second position information is within a threshold range, the average of the first position information and the normalized second position information is taken as the position of body parts; if the difference between the first position information and the normalized second position information exceeds the threshold range, the normalized second position information is taken as the position of the body parts.

In this embodiment, the first position information and the second position information are for example triaxial spatial coordinate data. The step of acquiring the first motion track data and the step of acquiring the second motion track data may be carried out at the same time. As the device or unit for implementing the above steps in the present embodiment is same as that in embodiment 1, it will not be described any more here.

In the above mentioned somatosensory recognition method, when the body action changes or a part of the body moves, the first motion track data of the body parts is obtained by the acquisition device, the second motion track data of the body parts is acquired by the wearable device, and then the first and second motion track data are compared to determine the body's action. As compared to the conventional somatosensory recognition technology, the present embodiment provides more accurate position information by the wearable device that senses in real time as the body parts moves, thereby improving the accuracy of somatosensory recognition.

In the above embodiments of the present invention, the output device is not necessarily disposed, and the input or output device on the wearable device is also optional. Those skilled in the art may add the above configurations as required without influencing the object of the present invention.

What are described above is related to the illustrative embodiments of the disclosure only and not limitative to the scope of the disclosure; the scopes of the disclosure are defined by the accompanying claims.

The invention claimed is:

1. A somatosensory recognition system for recognizing human body's action, comprising: an acquisition device configured to acquire a first motion track data of a body parts' action; a wearable device capable of being worn on the body parts and configured to acquire a second motion track data of the body parts' action; and a processing device configured to compare the first motion track data and the second motion track data and determine the body parts' action according to comparison result; wherein the processing device comprises an action recognition unit, a first wireless transmission unit and an action judgment unit, the action recognition unit is connected with the acquisition device and configured to recognize a first position information of the body parts from the first motion track data; the first wireless transmission unit is configured to receive the second motion track data from the wearable device and send the second motion track data to the action judgment unit; the action judgment unit is connected with the action recognition unit and configured to receive the first position information, and is further connected with the first wireless transmission unit and configured to receive the second motion track data from the first wireless transmission unit and extract a second position information of the wearable device from the second motion track data, compare the first position information and the second position information and determine a position of the body parts according to comparison result; wherein the action judgment unit is further configured to normalize the second position information before comparing the first position information and the second position information, the normalization comprising: storing an initial first position information recognized by the action recognition unit while the body parts are in stationary state; and then, adding the second position information to the stored initial first position information while the body parts are moving, so that a normalized second position information is obtained.

2. The somatosensory recognition system of claim 1, wherein each of the first position information and the second position information is triaxial spatial coordinate data.

3. The somatosensory recognition system of claim 1, wherein comparing the first position information and the second position information and determining the position of the body parts according to comparison result comprises:
comparing the first position information and the normalized second position information, if a difference between the first position information and the normalized second position information is within a threshold range, taking an average of the first position information and the normalized second position information as the position of the body parts; and if the difference between the first position information and the normalized second position information exceeds the threshold range, taking the normalized second position information as the position of the body parts.

4. The somatosensory recognition system of claim 1, wherein the wearable device comprises a data acquisition unit and a second wireless transmission unit;
the data acquisition unit is configured to acquire the second motion track data;
the second wireless transmission unit is connected with the data acquisition unit and configured to receive the second motion track data and send the second motion track data to the first wireless transmission unit.

5. The somatosensory recognition system of claim 4, wherein the wearable device further comprises a carrier in which the data acquisition unit and the second wireless transmission unit are disposed, the carrier comprises an article worn on the body, an article adorned the body, or a garniture mounted on any of the articles.

6. The somatosensory recognition system of claim 4, wherein the wearable device further comprises a second control unit which is configured to reset the data acquisition unit.

7. The somatosensory recognition system of claim 4, wherein the data acquisition unit comprises a sensor.

8. The somatosensory recognition system of claim 7, wherein the sensor is an accelerometer, a magnetic flow meter, or a gyro.

9. The somatosensory recognition system of claim 4, wherein each of the first wireless transmission unit and the second wireless transmission unit is Bluetooth, infrared or radio frequency apparatus.

10. The somatosensory recognition system of claim 1, further comprising an output device configured to output an instruction corresponding to the body parts' action.

11. The somatosensory recognition system of claim 10, wherein the processing device further comprises a first control unit connected with the action judgment unit, the first control unit is configured to look up a corresponding instruction according to a change in determined position of the body' part and send the instruction to the output device.

12. The somatosensory recognition system of claim 1, wherein the acquisition device comprises at least one image pick-up element.

13. A somatosensory recognition method, comprising: acquiring a first motion track data of body parts' action; acquiring a second motion track data of the body parts' action, the second motion track data being recorded by a wearable device worn on the body parts; and comparing the first motion track data and the second motion track data and determining the body parts' action according to comparison result, which operation comprises: acquiring a first position information of the body parts from the first motion track data, acquiring a second position information of the wearable device from the second motion track data, and comparing the first position information and the second position information, wherein before comparing the first position information and the second position information, the method further comprises: normalizing the second position information, wherein the normalization comprises: storing an initial first position information while the body parts are in stationary state, and then adding the second position information to the stored initial first position information while the body parts are moving to get the normalized second position information.

14. The somatosensory recognition method of claim 13, wherein comparing the first position information and the second position information and determining the position of the body parts according to comparison result comprises:
   comparing the first position information and the normalized second position information, if a difference between the first position information and the normalized second position information is within a threshold range, taking the average of the first position information and the normalized second position information as the position of the body parts; and when the difference between the first position information and the normalized second position information exceeds the threshold range, taking the normalized second position information as the position of the body parts.

15. The somatosensory recognition method of claim 13, further comprising:
   outputting an instruction corresponding to the body parts' action.

16. The somatosensory recognition method of claim 13, each of the first position information and the second position information is triaxial spatial coordinate data.

* * * * *